Jan. 15, 1924.

D. M. CUPP 1,481,126

CHAIN COUPLING

Filed July 7, 1923

Inventor,
Daniel M. Cupp.

By John S. Barker

Attorney

Patented Jan. 15, 1924.

1,481,126

UNITED STATES PATENT OFFICE.

DANIEL M. CUPP, OF MOUNT SOLON, VIRGINIA.

CHAIN COUPLING.

Application filed July 7, 1923. Serial No. 650,041.

*To all whom it may concern:*

Be it known that I, DANIEL M. CUPP, a citizen of the United States, residing at Mount Solon, in the county of Augusta and State of Virginia, have invented certain new and useful Improvements in Chain Couplings, of which the following is a specification.

My invention relates to couplings for chain links and is intended primarily to be used to unite the ends of the side chains of non-skid harness such as is used upon tires of motor vehicles to prevent slipping of the wheels upon wet or slippery pavements.

In the accompanying drawings—

In the accompanying drawings A represents the intermediate element or housing of the coupling, B the pivoted hook member thereof, and C the pivoted link member to which one end of a chain, D, is connected, the opposite end being adapted to engage with the hook member B. The intermediate member A is preferably U-shape in cross section, so it may serve as a housing, having side walls 2, 2, and a curved top 3. The link member, C, to which is united the end of the chain, is pivotally connected with the intermediate element A, at 4, its inner end entering the housing and its outer portion extending beyond the end thereof. The hook member B is pivotally united with the housing at 5, its inner end entering the latter, and engaging with the inner end of the part C, as will be described.

Figure 1:
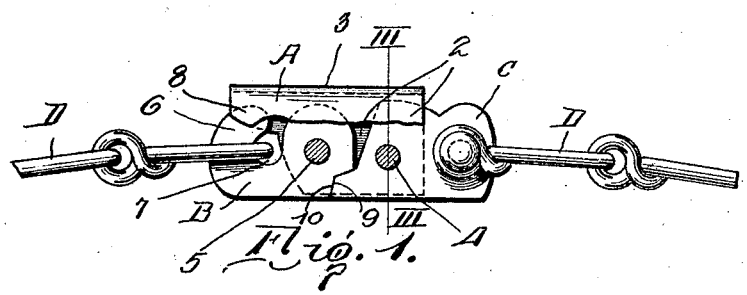
Figure 1 is a side elevation of a chain coupling made according to my invention, the parts being in ordinary working position.
Figure 4:
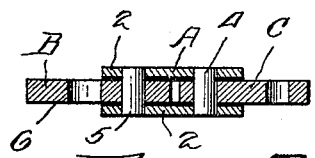
Fig. 4 is a longitudinal sectional view taken on the line IV—IV of Fig. 3.

That end of the housing to which is pivoted the hook member B has its top portion extended to form a U-shaped projection or hood 8. The part B has its outer end formed into a hook 6, the end of which enters the hood 8 when the coupling is in working position as represented in Fig. 1; but when the coupling is opened, the hook member turns on its pivot 5, and the outer end thereof falls away from the hood 8, leaving the end of the hook 6 entirely exposed, with a clear open space leading to the transverse chain link seat 7, at the base of the hook. When the coupling is closed and the parts occupy the positions shown in Fig. 1, the cross bar of the link that engages with the hook 6 occupies the seat 7, which is directly below the hood 8 of the housing and in advance of the lower front end position of the side walls 2. The inner lower ends or heels of the pivoted members B and C of the coupling, designated 10 and 9 respectively, are adapted to come into engagement with each other, when the parts of the coupling are in the positions represented in Figs. 1 and 4, and these positions are assumed whenever there is tension upon the opposite ends of the coupling. Such tension tends to pull the parts A, B and C into line with each other, and they are thus held so long as there is unimposed tension upon the parts of the coupling. When the coupling is used in connection with an anti-skid chain harness to unite the ends of the side chains thereof, the pull of the opposite ends of the chain D, engaging, respectively, with the pivoted parts B and C, is not on a straight line passing longitudinally through the coupling, but rather on lines tangential to the circle followed by the chain D as applied to the wheel, with the result that the tendency is to tilt the heels of the parts B and C upwardly, thus bringing them into engagement. This is insured by locating the pivots, 4, 5, that respectively unite the parts C and B with the intermediate supporting member between the heel ends thereof and the outer or exposed ends.

It will be seen that the connection between the parts B and C of the coupling is in the nature of a toggle, holding them rigidly in line with each other while in working position and under tension, but adapted, upon being moved, to break the toggle, to permit the hook member to swing freely in order that it may be moved to open position to permit the insertion or removal of a link.

The intermediate supporting and connecting member A of the coupling is represented as being of U-shape in cross section that it may serve as a housing, and this is the preferred form of this part; but the form may be varied without departing from my invention, as, for instance, it might be a single flat piece of metal corresponding with one of the side walls of the housing, designated 2. I refer to the curved portion 3 of the housing as its top or upper part because it is so shown in the drawings; but it is only for that reason and for convenience in description that it is so designated, because in the use of my invention which I have described, the portion 3 is as often below the side walls 3 as above, and the coupling works equally well in either position.

Figure 2:
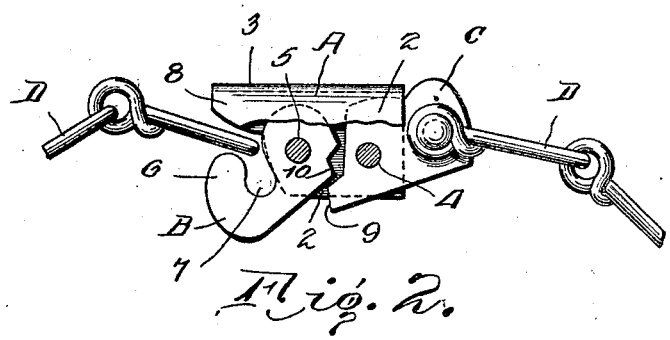
Fig. 2 is a side elevation illustrating the positions of the parts when the coupling is open to permit the insertion or removal of a chain link.
Figure 3:
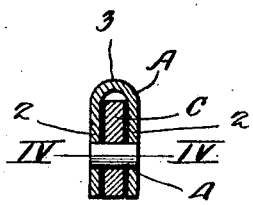
Fig. 3 is a transverse sectional view taken on the line III—III of Fig. 1.

The use and operation of my invention is as follows. it being assumed that the coupling is uniting links of a chain one end of which has permanent connection with the coupling element C and the other end separable connection with the hook of the element B. As has been stated, when the parts are in this position tension upon the links holds the parts of the coupling locked and in the position indicated in Figs. 1 and 4 of the drawings. When it is desired to open the coupling, in order, for instance, to disengage the link from the hook member B, the toggle connection is broken by raising the end, 8, of the intermediate or housing member A, tilting it about the pivot 4, and relative to the link part C. As the parts assume this position the hook member B is freed and falls to the position represented in Fig. 2, rocking upon its pivot 5, and the hook 6 moves away from the hood 8 so that there is left a free passage to and from the link seat 7. The parts being in position shown in Fig. 2, if a link of the chain D be passed to the seat 7 at the base of the hook, all that is necessary to bring the parts to locked, normal, and coupling position is to release the intermediate member C and apply tension to the portions of the chain united by the coupling, whereupon the parts of the latter assume the positions indicated in Fig. 1.

I have described and shown the link-engaged members B and C as having their inner portions in engagement when the coupling is in working position, and such portions constitute abutments to arrest and hold the pivoted parts of the coupling in proper working relationship. The specific arrangement shown is the preferred one for holding the parts A and B in working position because the abutments automatically shift with reference to each other, to permit the hook to open when the toggle is broken and to close and become locked when tension is applied to the outer ends of the parts B and C.

The coupling described is simple in construction, may be easily and cheaply manufactured, and has many features of practical utility, such as have been pointed out.

What I claim is:

1. In a coupling, the combination of an intermediate supporting member, a hook pivoted to one end thereof, and a link pivoted to the other end, the inner heel ends of the said hook and link members being arranged to come into engagement and serve as abutments to hold these parts in line, when the coupling is in working position, and said hook and link members being arranged to have attached to them respectively the ends of the members the coupling unites.

2. In a coupling, the combination of an intermediate supporting member, a hook pivoted to one end thereof, and a link pivoted to the other end, that end of the intermediate member to which the hook is pivoted being extended to overlie the hook and form a closed eye when in working position, the inner ends of the said hook and link members being arranged to come into engagement and hold these parts in working position when they are under tension, and the outer ends thereof being adapted to have connected to them respectively the members which the coupling unites.

3. In a coupling, the combination of an intermediate supporting housing, a hook pivoted to one end thereof, with its inner end extending into the housing, and a link pivoted to the other end, with its inner end also extending into the housing, the inner ends of the said hook and link members being arranged to come into engagement and hold these parts in line, with the hook closed, when they are under tension, and the outer ends of such members being arranged to have connected to them respectively the members which the coupling unites, and the parts of the coupling being so related that when the intermediate part is tilted relative to the link part the engagement of the inner ends of the outer pivoted members is broken, leaving the hook free to move to open the coupling.

4. In a coupling, the combination of a pair of pivoted connecting members, one of them a hook, to which the members united by the coupling are respectively secured, and a toggle connection uniting them rigidly in line when under tension, the toggle being adapted when broken to free the hook and permit it to move.

DANIEL M. CUPP.